United States Patent
Kim

(10) Patent No.: US 9,564,091 B2
(45) Date of Patent: Feb. 7, 2017

(54) DISPLAY DEVICE HAVING CONNECTION LINES CONNECTED BETWEEN A DATA DRIVER AND DATA LINES

(71) Applicant: Samsung Display Co., Ltd., Yongin, Gyeonggi-Do (KR)

(72) Inventor: So-Woon Kim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 156 days.

(21) Appl. No.: 14/152,746

(22) Filed: Jan. 10, 2014

(65) Prior Publication Data

US 2014/0225818 A1 Aug. 14, 2014

(30) Foreign Application Priority Data

Feb. 13, 2013 (KR) .................. 10-2013-0015397

(51) Int. Cl.
*G09G 3/36* (2006.01)
*G02F 1/1345* (2006.01)

(52) U.S. Cl.
CPC ........... *G09G 3/3611* (2013.01); *G02F 1/1345* (2013.01)

(58) Field of Classification Search
None
See application file for complete search history.

(56) References Cited

U.S. PATENT DOCUMENTS

| 6,888,605 B2 | 5/2005 | Yamaguchi |
| 8,008,665 B2 | 8/2011 | Yang et al. |
| 2003/0086048 A1 * | 5/2003 | Ukita ........................ 349/149 |
| 2007/0195254 A1 | 8/2007 | Lee et al. |
| 2007/0285370 A1 | 12/2007 | Kim |
| 2012/0315715 A1 * | 12/2012 | Cho et al. ........................ 438/30 |

FOREIGN PATENT DOCUMENTS

| JP | 10-153791 | | 6/1998 |
| JP | 10-153791 | * | 9/1998 |
| JP | 11-326933 | * | 11/1999 |
| JP | 2002-214634 | | 7/2002 |

(Continued)

OTHER PUBLICATIONS

European Search Report corresponding to EP 13195964.5, Jun. 12, 2014, 10 pages.

*Primary Examiner* — Ilana Spar
*Assistant Examiner* — Kirk Hermann
(74) *Attorney, Agent, or Firm* — Innovation Counsel LLP

(57) ABSTRACT

A liquid crystal display according to an exemplary embodiment of the present invention includes: a substrate; a plurality of gate lines and a plurality of data lines disposed at a display area; a data driver; and a plurality of driver connection lines disposed at a peripheral area and connecting the plurality of data lines and the data driver, wherein the plurality of driver connection lines include a plurality of first connection portions connected to the plurality of data lines, a plurality of second connection portions connected to the data driver, and a plurality of oblique line portions disposed between the plurality of first connection portions and the plurality of second connection portions, and an imaginary line connecting a plurality of direction change portions disposed at a boundary portion between the plurality of second connection portions and the plurality of oblique line portions does not have a straight line.

15 Claims, 7 Drawing Sheets

(56) References Cited

FOREIGN PATENT DOCUMENTS

| | | | |
|---|---|---|---|
| JP | 2007-188763 | | 7/2007 |
| JP | 2010-096944 | | 4/2010 |
| JP | 2010-243527 | | 10/2010 |
| KR | 2003-0074038 | * | 9/2003 |
| KR | 10-0611153 | | 8/2006 |
| KR | 10-2008-0074367 | | 8/2008 |
| KR | 10-0859513 | | 9/2008 |

* cited by examiner

DISPLAY DEVICE HAVING CONNECTION LINES CONNECTED BETWEEN A DATA DRIVER AND DATA LINES

CROSS-REFERENCE TO RELATED APPLICATION

This application claims priority to and the benefit of Korean Patent Application No. 10-2013-0015397 filed in the Korean Intellectual Property Office on Feb. 13, 2013, the entire contents of which are incorporated herein by reference.

BACKGROUND OF THE INVENTION (a) Field of the Invention

Embodiments of the present invention relate to a display device.

(b) Description of the Related Art

A thin film transistor (TFT) array panel is used for independently driving each pixel in a liquid crystal display or an organic electroluminescent (EL) display device and the like.

The thin film transistor array panel includes a scanning signal wire or a gate wire that transmits a scanning signal, an image signal wire or a data wire that transmits an image signal, a thin film transistor that is connected to the gate wire and the data wire, a pixel electrode that is connected to the thin film transistor, a gate insulating layer that covers and insulates the gate wire, and an interlayer insulating layer that covers and insulates the thin film transistor and the data wire.

The data wire disposed in the display area of the thin film transistor array panel receives a data signal from a data driver disposed outside the display area. At this time, to connect the data wire disposed in the display area and the data driver disposed outside the display area, a plurality of driver connection lines are formed. To connect each driver connection line to each data wire, each direction change portion where an extending direction of the driver connection line is changed is formed.

A material layer such as an alignment layer may be formed by a spin coating method. When the direction change portions of a plurality of driver connection lines form an imaginary straight line, the material layer that is coated by the spin coating method may have an ununiform thickness due to the direction change portions.

The thickness difference of the material layer that is coated on the display panel of the display device may cause spots in the display area along with a normal line direction of the imaginary straight line.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention prevent display quality deterioration such as spots of a display area generated along with a normal line direction of the imaginary straight line.

A liquid crystal display according to an exemplary embodiment of the present invention includes: a substrate including a display area and a peripheral area surrounding the display area; a plurality of gate lines and a plurality of data lines disposed at the display area of the substrate; a data driver transmitting a data signal to the plurality of data lines; and a plurality of driver connection lines disposed at the peripheral area of the substrate and connecting the plurality of data lines and the data driver, wherein the plurality of driver connection lines include a plurality of first connection portions connected to the plurality of data lines, a plurality of second connection portions connected to the data driver, and a plurality of oblique line portions disposed between the plurality of first connection portions and the plurality of second connection portions, and an imaginary line connecting a plurality of direction change portions disposed at boundary portions between the plurality of second connection portions and the plurality of oblique line portions have a curved line shape.

The second connection portion of the plurality of driver connection lines may include a plurality of first portions and a plurality of second portions extending in different directions, and the plurality of first portions and the plurality of second portions may be alternately disposed one by one and are connected to each other.

The plurality of first portions may extend in a direction parallel to the plurality of gate lines, and the plurality of second portions may extend in a direction parallel to the plurality of data lines.

The plurality of driver connection lines may include a plurality of first driver connection lines including an oblique line portion extending toward a left lower direction toward the display area with reference to the data driver, and a plurality of second driver connection lines including an oblique line portion extending toward a right lower direction toward the display area.

A ratio of a first distance, a maximum distance from a reference straight line to a nearest direction change portions of a driver connection lines, to a second distance, a distance from the reference straight line to a furthermost direction change portion of the driver connection line having the maximum distance may be more than about 20%. The reference straight line is a line connecting a nearest direction change portion of an outermost driver connecting line and a nearest direction change portion of an innermost driver connecting line The ratio may be more than about 24%.

The plurality of first field generating electrodes may be dispose on the substrate and connected to a plurality of gate lines thin film transistor and a plurality of data lines and a second field generating electrode may be dispose on the substrate and overlapping the first field generating electrode via an insulating layer.

The plurality of driver connection lines may include a plurality of first driver connection lines including oblique line portions extending toward a left lower direction toward the display area with reference to the data driver, and a plurality of second driver connection lines including oblique line portions extending toward a right lower direction toward the display area The display device may further include a plurality of first field generating electrodes disposed on the substrate and connected to a plurality of thin film transistors and a plurality of data lines, and a second field generating electrode disposed on the substrate and overlapping the first field generating electrode via an insulating layer.

A liquid crystal display according to an exemplary embodiment of the present invention may include a substrate including a display area and a peripheral area surrounding the display area, a plurality of gate lines and a plurality of data lines disposed at the display area of the substrate, a data driver transmitting a data signal to the plurality of data lines, and a plurality of driver connection lines disposed at the peripheral area of the substrate and connecting the plurality of data lines and the data driver. The plurality of driver connection lines may include a plurality of first connection portions connected to the plurality of data lines, a plurality of second connection portions connected to the data driver, and a plurality of oblique line portions disposed between the plurality of first connection portions and the plurality of second connection portions, and an imaginary line connecting a plurality of direction change portions disposed at a boundary portions between the plurality of second connection portions and the plurality of oblique line portions does not have a straight line.

A ratio of a first distance, a maximum distance from a reference straight line to a nearest direction change portions of a driver connection lines, to a second distance, a distance from the reference straight line to a furthermost direction change portion of the driver connection line having the maximum distance may be more than about 20%. The reference straight line is a line connecting a nearest direction change portion of an outermost driver connecting line and a nearest direction change portion of a driver connecting line at a vertex where the direction change portion is farthest from the data driver. The ratio may be more than about 24%.

The curved line may have a vertex on the driver connection line connected to a center of the data driver.

The curved line may have a vertex on the driver connection line connected to an off-center of the data driver.

The curved line may have a dual vertex on the driver connection line.

The curved line may have a sinusoidal curve.

In the display device according to an exemplary embodiment of the present invention, the direction change portions of the plurality of driver connection lines connecting the data wire of the display area and the data driver are formed to not be disposed on the straight line such that a display quality deterioration such as spots of the display area generated along with a normal line direction in the direction change portions of the plurality of driver connection lines may be prevented.

DETAILED DESCRIPTION OF THE EMBODIMENTS

Figure 1:
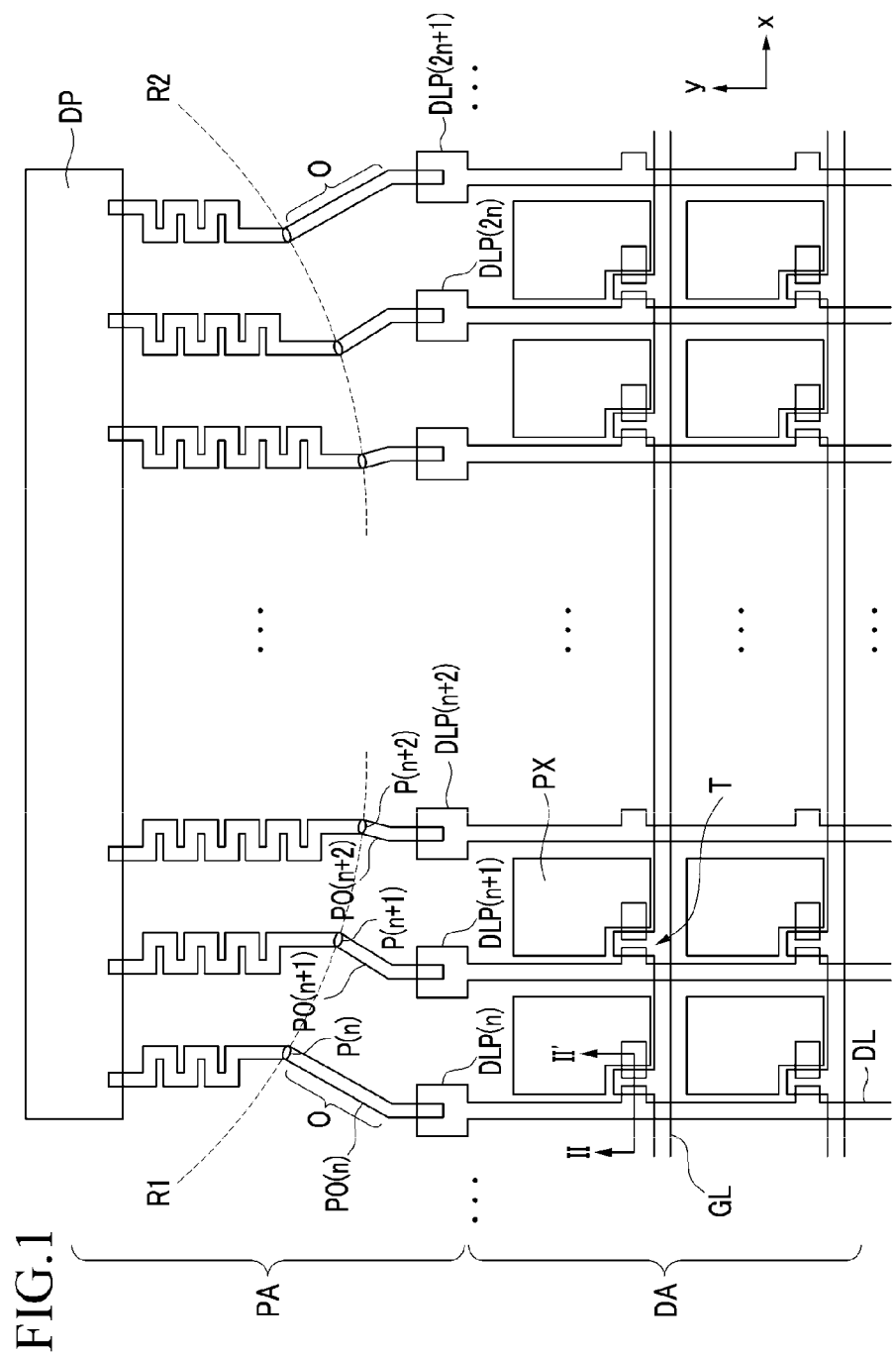
FIG. 1 is a layout view of a liquid crystal display according to an exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A thin film transistor array panel according to an exemplary embodiment of the present invention will be described with reference to FIG. 1. FIG. 1 is a layout view of a thin film transistor array panel according to an exemplary embodiment of the present invention.

Referring to FIG. 1, a thin film transistor array panel according to an exemplary embodiment of the present invention includes a display area in which a plurality of pixels are arranged for displaying images, and a peripheral area surrounding the display area.

The display area includes a plurality of gate lines GL, a plurality of data lines DL, a plurality of transistors T, and a plurality of pixel electrodes PX connected to the transistors T.

The peripheral area PA includes a plurality of data pad portions DLP, a data driver DP, and a plurality of driver connection lines PO connecting the plurality of data pad portions DLP and the data driver DP.

Each data pad portion DLP is one end of the data line DL disposed in the peripheral area. Similar to the data line DL and the data pad portion DLP, the driver connection line PO connected to the data pad portion DLP may be formed directly on the substrate on which the data line DL and the data pad portion DLP are formed, and may be separately formed with a film shape and to be connected to the data pad portion DLP. Similar to the data line DL and the data pad portion DLP, the data driver DP may also be formed directly on the substrate on which the data line DL and the data pad portion DLP are formed, and may be separately formed with a film shape or an Integrated Chip shape to be connected to the driver connection line PO.

A plurality of driver connection lines PO include a plurality of first connection portions connected to the data pad portions DLP, a plurality of second connection portions connected to the data driver DP, and an oblique line portions O disposed between the first connection portions and the second connection portions. The line connects the direction change portions P disposed at the boundary portions of the second connection portions and the oblique line portions of a plurality of driver connection lines PO forms a non-straight line, for example curved line shapes R1 and R2 are formed.

The oblique line portions of the portions PO(n), PO(n+1), and PO(n+2) of the plurality of driver connection lines PO extend toward the left lower direction with reference to the data driver DP from the second connection portions toward the first connection portions, and the portions of the plurality of driver connection lines PO extend toward the right lower direction from the second connection portions toward the first connection portions.

The second connection portions include a plurality of the first portions and a plurality of the second portions extending in different directions, and the first portion and the second portion are alternately disposed one by one. In detail, the second connection portions include a plurality of the first portions extending in the first direction (X) parallel to the gate line and a plurality of the second portions extending in the second direction (Y) parallel to the data line, and the first portions and the second portions are alternately disposed to be connected.

Figure 2:
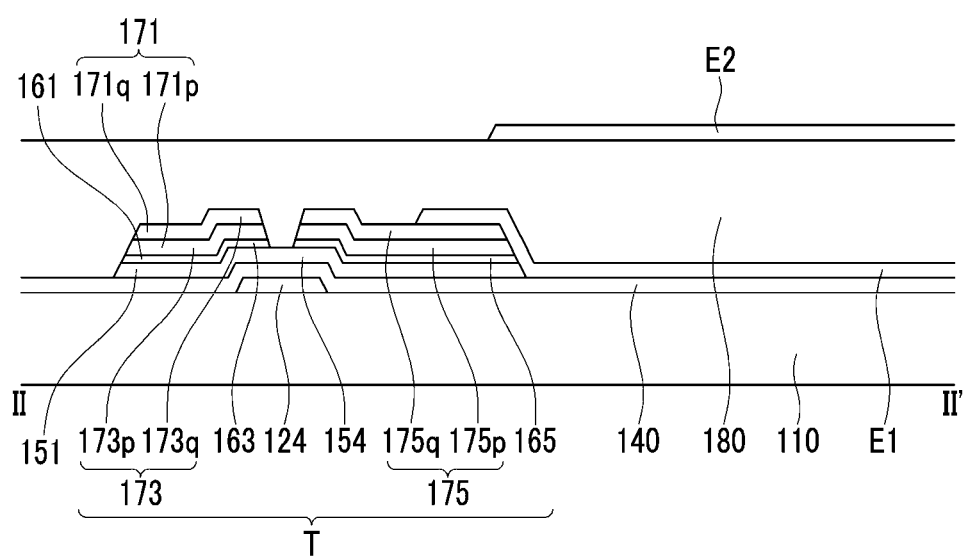
FIG. 2 is a cross-sectional view of the liquid crystal display according to an exemplary embodiment of the present invention taken along the line II-II' of FIG. 1.

Next, a layer structure of a thin film transistor array panel of a liquid crystal display according to an exemplary embodiment of the present invention will be described with reference to FIG. 2. FIG. 2 is a cross-sectional view of the liquid crystal display according to an exemplary embodiment of the present invention taken along the line II-II' of FIG. 1.

Referring to FIG. 1 and FIG. 2, a gate line GL including a gate electrode 124 is disposed on an insulation substrate 110 made of transparent glass or plastic.

The gate line GL transmits a gate signal and mainly extends in the first direction (X). Each gate line GL includes a plurality of gate electrodes 124 that protrude from the gate line GL and an end portion having a wide area (not shown) for connection with another layer or external driving circuit.

A gate insulating layer 140 made of silicon nitride (SiNx) or silicon oxide (SiOx) is formed on the gate line GL. A semiconductor 154, ohmic contacts 163 and 165, and a data line 171 including a source electrode 173 and a drain electrode 175 are formed on the gate insulating layer 140. The semiconductor 154 may include an oxide semiconductor, and when the semiconductor 154 includes the oxide semiconductor, the ohmic contacts 163 and 165 may be omitted.

The data line 171 transmits a data signal and mainly extends in the second direction (Y) thereby crossing the gate line GL. The data line 171 includes the source electrode 173 extending toward the gate electrode 124. The drain electrode 175 is separated from the data line 171 and faces the source electrode 173 with respect to the gate electrode 124.

A gate electrode 124, a first source electrode 173, and a drain electrode 175 along with a semiconductor 154 form a thin film transistor TFT having a channel formed in the semiconductor island 154 disposed between the source electrode 173 and the drain electrode 175.

The semiconductor 154 may have substantially the same plane shape as the data line 171, the drain electrode 175, and the underlying ohmic contacts 163 and 165. However, the semiconductor 154 include exposed portions that are not covered by the source electrode 173 and the drain electrode 175, and portions that are disposed between the data line 171 and the drain electrode 175. The data line 171, the drain electrode 175, and the source electrode 173 may have a dual-layer structure that is formed of lower layers 171p, 173p, and 175p and upper layers 171q, 173q, and 175q. However, the data line 171, the source electrode 173, and the drain electrode 175 may have a singular structure or a multilayer structure of 2 or more layers.

A semiconductor stripe layer 151 and an ohmic contact stripe 161 are disposed under the data line 171, and the semiconductor stripe layer 151 and the ohmic contact stripe 161 may have the same plane shape as the data line DL. The semiconductor 154 extends from the semiconductor stripe layer 151 and the ohmic contact 163 extends from the ohmic contact stripe 161.

The first field generating electrode E1 is connected to the drain electrode 175 and disposed on the drain electrode 175 and the gate insulating layer 140. The first field generating electrode E1 may be made of a transparent conductor such as ITO or IZO, or a reflective conductor such as silver, aluminum, chromium, or alloys thereof.

A passivation layer 180 is disposed on the data line 171, the drain electrode 175, the exposed semiconductor 154, and the first field generating electrode E1.

The passivation layer 180 is made of an inorganic insulator or an organic insulator, and a surface thereof may be flat. As an example of the inorganic insulator, there are silicon nitride and silicon oxide. The organic insulator may have a dielectric constant of less than 4.0, and photosensitivity. Also, the passivation layer 180 may have a dual-layered structure of a lower inorganic layer and an upper organic layer so that the upper organic layer may not harm the exposed portion of the semiconductor 154 while still sustaining the excellent insulation characteristics of the organic layer.

The second field generating electrode E2 is disposed on a portion of the passivation layer 180.

In this way, the thin film transistor array panel of the liquid crystal display according to an exemplary embodiment of the present invention includes the first field generating electrode E1 and the second field generating electrode E2 disposed on the insulation substrate 110 and overlapping each other via the insulating layer. However, in a case of the liquid crystal display according to another exemplary embodiment of the present invention, one of the first field generating electrode E1 and the second field generating electrode E2 may be disposed on a display panel facing the thin film transistor array panel.

Next, a liquid crystal display according to an exemplary embodiment of the present invention will be described in detail with reference to FIG. 3.

Figure 3:
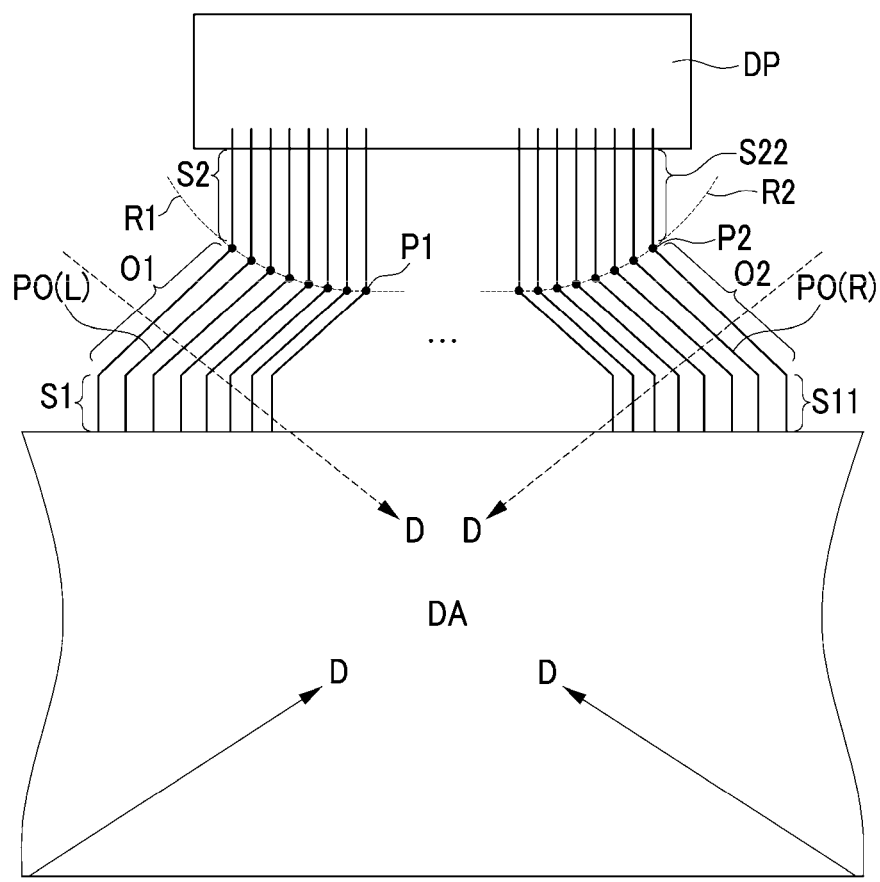
FIG. 3 is a layout view of a liquid crystal display according to an exemplary embodiment of the present invention.

Referring to FIG. 3, a plurality of data pad portions at the end portion of the data line of the display area DA are connected to the first connection portions S1 and S11 of a plurality of driver connection lines PO(L) and PO(R), the first connection portions S1 and S11 are connected to the oblique line portions O1 and O2, and the oblique line portions O1 and O2 are connected to the second connection portions S2 and S22. The second connection portions S2 and S22 are connected to the data driver DP.

The first oblique line portion O1 of the first driver connection lines PO(L) of a plurality of driver connection lines PO(L) and PO(R) extends toward the left lower direction with reference to the data driver DP from the second connection portion S2 connected to the data driver DP toward the first connection portion S1. Also, the second oblique line portion O2 of the second driver connection lines PO(R) among the plurality of driver connection lines PO(L) and PO(R) extends toward the right lower direction with reference to the data driver DP from the second connection portion S22 connected to the data driver DP toward the first connection portion S11.

The imaginary line connecting the first direction change portions P1 disposed at the boundary portions between the first oblique line portions O1 and the second connection portions S2 of the first driver connection lines PO(L) forms the first curved line R1. The curved line has a vertex on the driver connection line connected to a center of the data driver Similarly, the imaginary line connecting the second direction change portions P2 disposed at the boundary portions between the second oblique line portions O2 and the second connection portions S22 of the second driver connection lines PO(R) forms the second curved line R2.

In the exemplary embodiment shown, the shape of the first curved line R1 and the shape of the second curved line R2 are symmetrical to each other, however in the liquid crystal display according to another exemplary embodiment of the present invention, the shape of the first curved line R1 and the shape of the second curved line R2 may not be symmetrical to each other.

Also, although not shown, the second connection portions S2 and S22 connected to the data driver DP include the plurality of first portions and the plurality of second portions extending in different directions, and the first portions and the second portions are alternately disposed one by one. In detail, the second connection portions S2 and S22 include the plurality of first portions extending in the first direction parallel to the gate line and the plurality of second portions extending in the second direction parallel to the data line, and the first portion and the second portion may be alternately disposed to be connected.

In the liquid crystal display according to an exemplary embodiment of the present invention, an imaginary line connecting the direction change portions disposed at the boundary portions between the oblique line portions of the driver connection lines and the second connection portions connected to the data driver is not a straight line, but has a curved line shape. Accordingly, the imaginary line connecting the direction change portions disposed at the boundary portions between the oblique line portions of the driver connection lines and the second connection portions connected to the data driver does not form the straight line.

The direction from the edge of the display area DA to the center of the display area DA, in detail, the direction that an arrow D of FIG. 3 indicates, is substantially parallel to a direction of a centrifugal force applied to the display area DA when forming the material layer such as the alignment layer in the liquid crystal display by the spin coating method. The material layer deposited by the spin coating may be accumulated near the direction change portions disposed at the boundary portions between the oblique line portions of the driver connection lines and the second connection portions connected to the data driver.

If an imaginary line connecting the direction change portions disposed at the boundary portions between the oblique line portions of the driver connection lines and the second connection portions connected to the data driver is parallel to the direction of the centrifugal force applied to the display area DA, the material layer having a height that is increased near the direction change portions is moved into a display region along the imaginary line connecting the direction change portions. This height difference of the material layer such as the alignment layer causes display quality deterioration such as spots.

However, in the liquid crystal display according to an exemplary embodiment of the present invention, the imaginary line connecting the direction change portions disposed at the boundary portions between the oblique line portions of the driver connection lines and the second connection portions connected to the data driver is not a straight line, but has the curved line shape. Accordingly, the imaginary line connecting the direction change portions disposed at the boundary portions between the oblique line portions of the driver connection lines and the second connection portions connected to the data driver does not form the straight line that accords with the direction of the centrifugal force of the spin coating. The movement of the material layer having the increased height near the direction change portions may be prevented during the spin coating, thereby preventing the display quality deterioration according to the height difference of the material layer such as the alignment layer.

Figure 4:
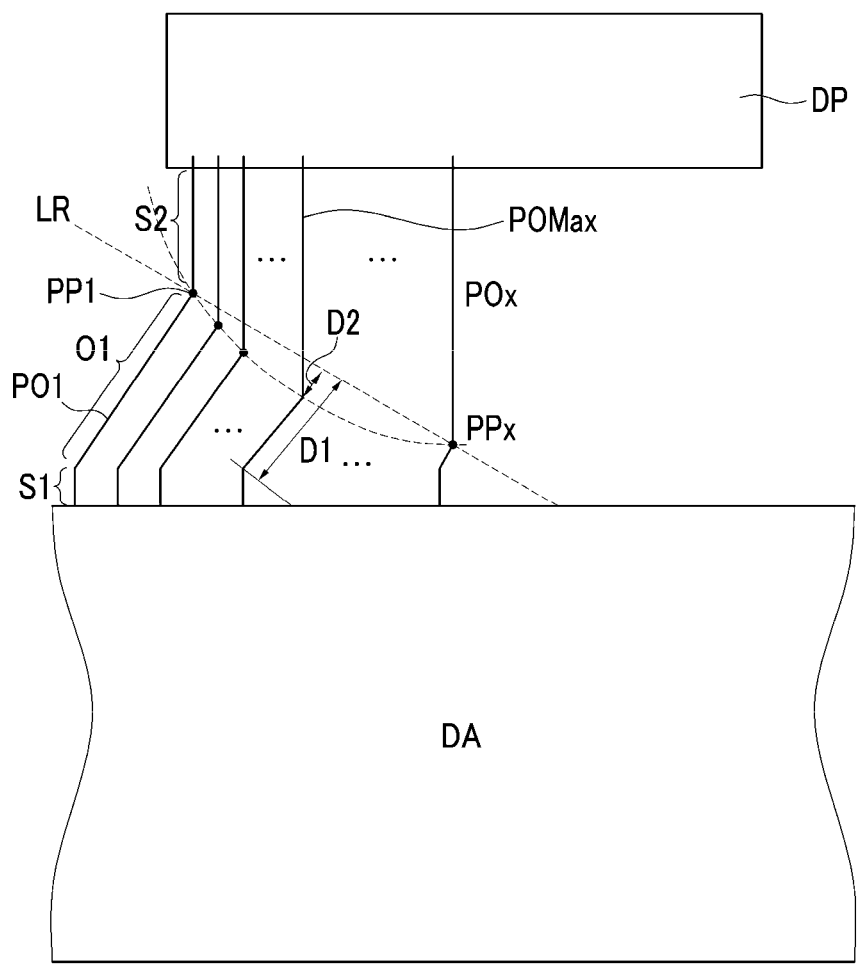
FIG. 4 is a layout view to explain a direction change portion of a driver connection line in a liquid crystal display according to an exemplary embodiment of the present invention.

Next, a curved line shape of the imaginary line connecting the direction change portions of the driver connection lines of the liquid crystal display according to an exemplary embodiment of the present invention will be described with reference to FIG. 4. FIG. 4 is a layout view to explain a direction change portion of a driver connection line in a liquid crystal display according to an exemplary embodiment of the present invention.

Referring to FIG. 4, the oblique line portion of a plurality of driver connection lines extends toward the left lower direction with reference to the data driver DP from the second connection portion S2 connected to the data driver DP toward the first connection portion S1. The imaginary line connecting the direction change portions disposed at the boundary portions between the oblique line portions O1 of the driver connection lines and the second connection portions S2 connected to the data driver forms the curved line.

When the reference straight line LR is referred to as a line connecting a nearest direction change portion of an outermost driver connecting line and a nearest direction change portion of a driver connecting line at a vertex where the direction change portion is farthest from the data driver. A ratio of a first distance, a maximum distance from a reference straight line to a nearest direction change portions of a driver connection lines, to a second distance, a distance from the reference straight line to a furthermost direction change portion of the driver connection line having the maximum distance is more than about 20%. More preferably, the ratio is more than 24%.

Referring to FIG. 4, the reference straight line LR is referred to as a line passing the direction change portion PP1 between the oblique line portion O1 and the second connection portion S2 of the first driver connection line PO1 disposed outermost with reference to the data driver DP among the driver connection lines and the direction change portion PPx between the oblique line portion O1 and the second connection portion S2 of the second driver connection line POx disposed centermost with reference to the data driver DP, a ratio of a minimum interval D2 to a maximum interval D1 from the oblique line portion O1 at a third driver connection line POMax, which has a maximum distance from the reference straight line LR to the direction change portion, is preferably more than about 20%, and in detail, 24%.

Although not shown, when the oblique line portions of the plurality of driver connection lines extends toward the right lower direction with reference to the data driver DP from the second connection portions connected to the data driver DP toward the first connection portions, a similar range may be applied.

Also, although not shown, the second connection portions S2 of the driver connection lines PO, disposed between the data driver DP and the oblique line portions of the driver connection lines, include the plurality of first portions and the plurality of second portions extending in the different directions, and the first portions and the second portions are alternately disposed one by one. In detail, the second connection portions of the driver connection lines PO include the plurality of first portions extending in the first direction parallel to the gate line and the plurality of second portions extending in the second direction parallel to the data line, and the first portions and the second portions may be alternately disposed to be connected.

Figure 5:
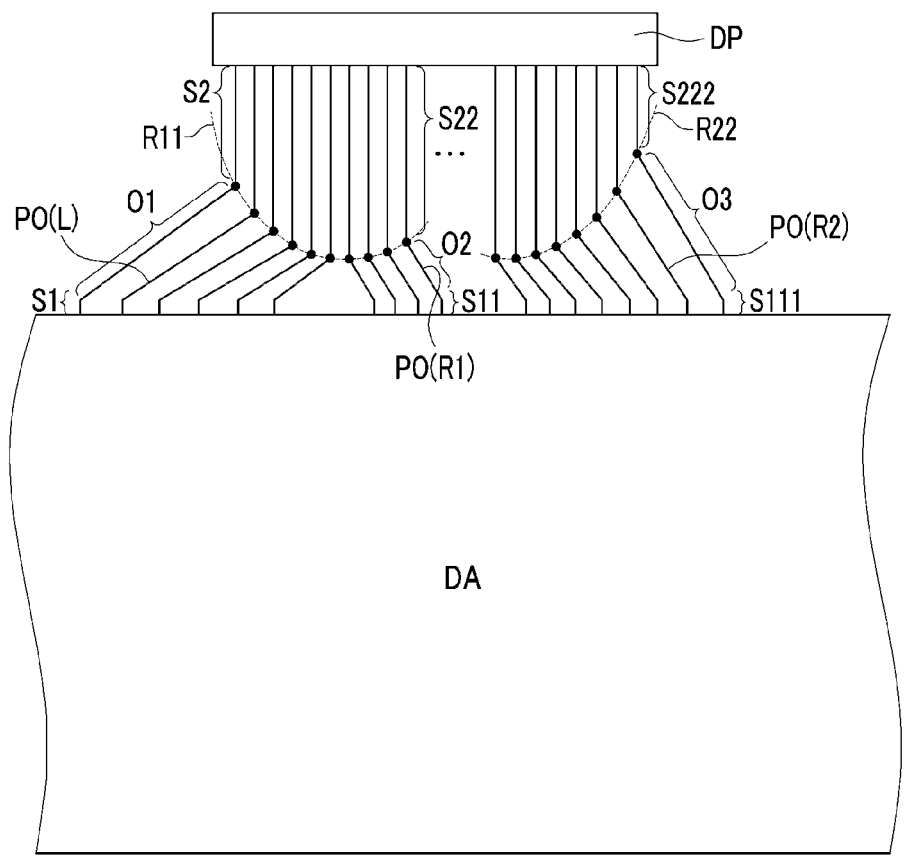
FIG. 5 is a layout view of a liquid crystal display according to an exemplary embodiment of the present invention.

Next, a liquid crystal display according to another exemplary embodiment the present invention will be described with reference to FIG. 5. FIG. 5 is a layout view of a liquid crystal display according to an exemplary embodiment of the present invention.

Referring to FIG. 5, the liquid crystal display according to the present exemplary embodiment is similar to the liquid crystal display according to the exemplary embodiments described with reference to FIG. 1 to FIG. 4. The curved line has a dual vertex on the driver connection line.

However, different from the liquid crystal displays according to the previous exemplary embodiments, in the liquid crystal display according to the present exemplary embodiment, the plurality of driver connection lines include first driver connection lines PO(L), third driver connection lines PO(R1), and fourth driver connection lines PO(R2). When the reference straight line LR is referred to as a line connecting a nearest direction change portion of an outermost driver connecting line and a nearest direction change portion of a driver connecting line at a vertex where the direction change portion is farthest from the data driver. A ratio of a first distance, a maximum distance from a reference straight line to a nearest direction change portions of a driver connection lines, to a second distance, a distance from the reference straight line to a furthermost direction change portion of the driver connection line having the maximum distance is more than about 20%. More preferably, the ratio is more than 24%.

The first oblique line portions O1 of the first driver connection lines PO(L) extend toward the left lower direction with reference to the data driver DP from the second connection portions S2 connected to the data driver DP toward the first connection portions S1 connected to the display area DA. Also, the second oblique line portions O2 of the third driver connection lines PO(R1) extend toward the right lower direction with reference to the data driver DP from the second connection portions S22 connected to the data driver DP toward the first connection portions S11 connected to the display area DA. Similarly, the third oblique line portions O3 of the fourth driver connection lines PO(R2) extend toward the right lower direction with reference to the data driver DP from the second connection portions S222 connected to the data driver DP toward the first connection portions S111 connected to the display area DA.

However, the imaginary line connecting the direction change portions between the oblique line portions O1, O2 and the second connection portions of the first driver connection lines PO(L) and the third driver connection lines PO(R1) forms a third curved line R11 shape, the imaginary line connecting the direction change portions between the oblique line portions and the second connection portions of the fourth driver connection lines PO(R2) forms a fourth curved line R22 shape, and the third curved line R11 and the fourth curved line R22 have different curvatures.

Also, although not shown, the second connection portions S2, S22, and S222 of the driver connection lines PO disposed between the data driver DP and the oblique line portions of the driver connection lines include a plurality of the first portions and a plurality of the second portions extending in different directions, and the first portions and the second portions are alternately disposed one by one. In detail, the second connection portions S2, S22, and S222 of the driver connection line PO include the plurality of first portions extending in the first direction parallel to the gate line and the plurality of second portions extending in the second direction parallel to the data line, and the first portions and the second portions may be alternately disposed to be connected.

In this way, by changing the shape and the position of the imaginary lines connecting the direction change portions between the oblique line portions and the second connection portions of the driver connection lines, the direction of the imaginary line formed by connecting the direction change portions and the direction in which the centrifugal force is applied during spin coating may be different. Accordingly, the display quality deterioration according to the height difference of the material layer such as the alignment layer may be prevented.

Many characteristics of the liquid crystal display according to the exemplary embodiments described with reference to FIG. 1 to FIG. 4 may be applied to the liquid crystal display according to the present exemplary embodiment.

Figure 6:
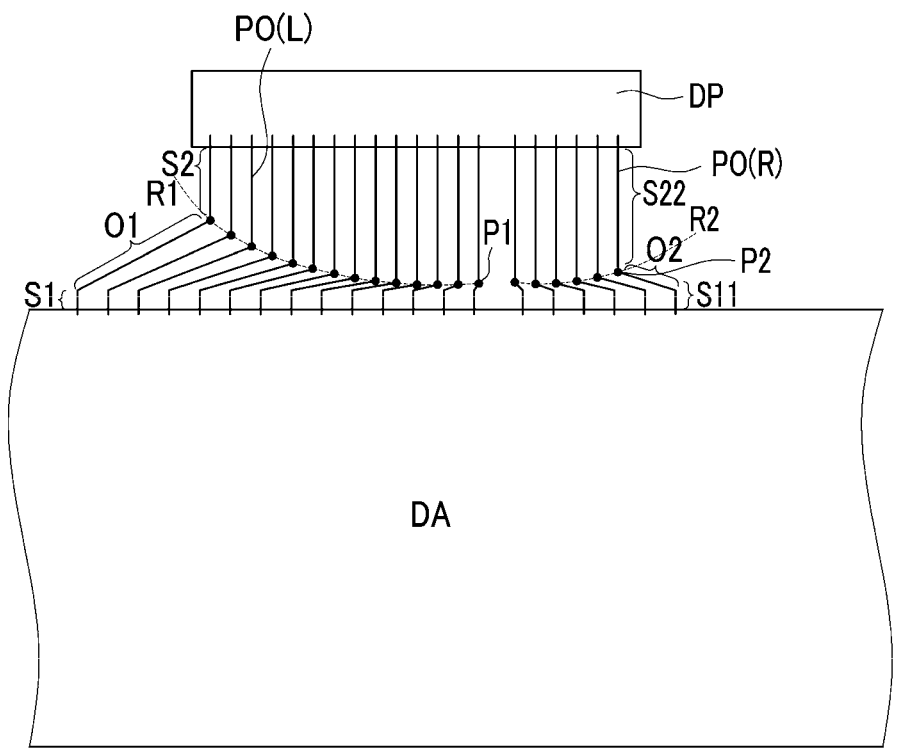
FIG. 6 is a layout view of a liquid crystal display according to an exemplary embodiment of the present invention.

Next, a liquid crystal display according to another exemplary embodiment the present invention will be described with reference to FIG. 6. FIG. 6 is a layout view of a liquid crystal display according to an exemplary embodiment of the present invention.

Referring to FIG. 6, the liquid crystal display according to the present exemplary embodiment is similar to the liquid crystal display according to the exemplary embodiments described with reference to FIG. 1 to FIG. 4. The curved line has a vertex on the driver connection line connected to an off-center of the data driver.

If the direction change portions disposed at the boundary portions between the oblique line portions O and the second connection portions S2 of the first driver connection lines PO(L) among the plurality of driver connection lines PO(L) and PO(R) are connected, the first curved line R1 shape is formed. Similarly, if the direction change portions disposed at the boundary portions between the oblique line portions and the second connection portions S2 of the first driver connection lines PO(R) among the plurality of driver connection lines PO(L) and PO(R) are connected, the second curved line R2 shape is formed. The first curved line R1 and the second curved line R2 may have the same curvature radius.

However, the number of first driver connection lines PO(L) of the liquid crystal display of the present exemplary embodiment is larger than the number of second driver connection lines PO(R).

Also, although not shown, the second connection portions S2 and S22 of the driver connection lines PO(L) and PO(R) disposed between the data driver DP and the oblique line portions O1 and O2 of the driver connection lines PO(L) and PO(R) include a plurality of the first portions and a plurality of the second portions extending in the different directions, and the first portions and the second portions are alternately disposed one by one. In detail, the second connection portions of the driver connection lines PO(L) and PO(R) include a plurality of the first portions extending in the first direction parallel to the gate line and a plurality of the second portions extending in the second direction parallel to the data line, and the first portions and the second portions may be alternately disposed to be connected.

In this way, by changing the shape and the position of the lines connecting the direction change portions between the oblique line portions and the second connection portions of the driver connection lines, the direction of the imaginary line formed by connecting the direction change portions and the direction that the centrifugal force is applied during the spin coating may be different, and accordingly, the display quality deterioration according to the height difference of the material layer such as the alignment layer may be prevented.

Many characteristics of the liquid crystal display according to the exemplary embodiments described with reference to FIG. 1 to FIG. 4 may be applied to the liquid crystal display according to the present exemplary embodiment.

Figure 7:
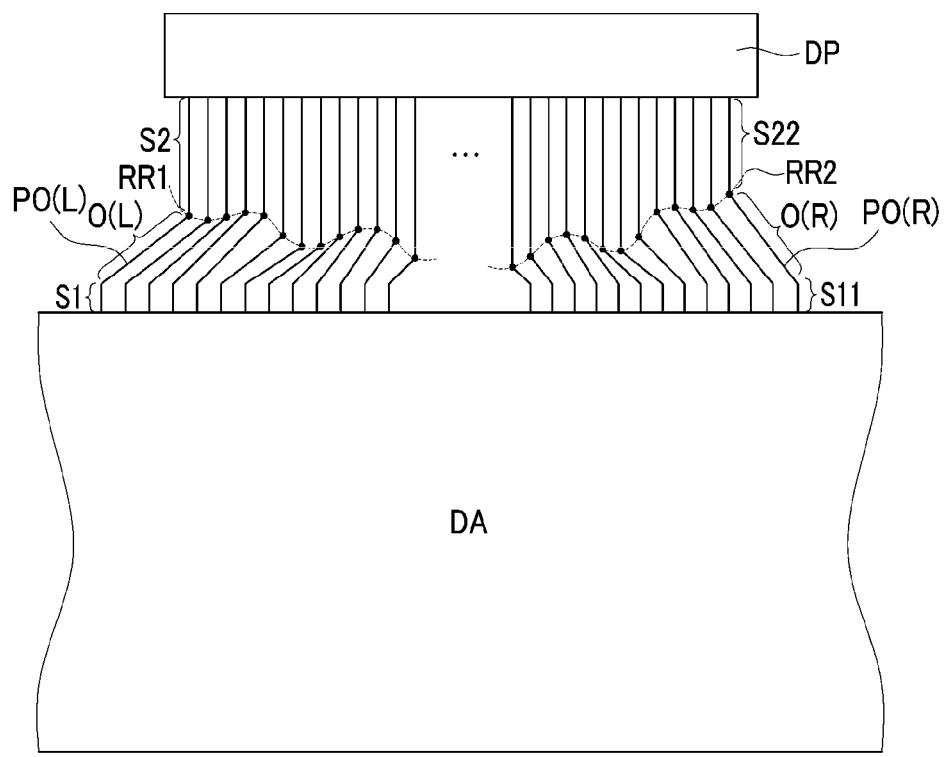
FIG. 7 is a layout view of a liquid crystal display according to an exemplary embodiment of the present invention.

Next, a liquid crystal display according to another exemplary embodiment the present invention will be described with reference to FIG. 7. FIG. 7 is a layout view of a liquid crystal display according to an exemplary embodiment of the present invention.

Referring to FIG. 7, the liquid crystal display according to the present exemplary embodiment is similar to the liquid crystal display according to the exemplary embodiments described with reference to FIG. 1 to FIG. 4.

When connecting the first direction change portions disposed at the boundary portions between the oblique line portions O(L) and the second connection portions S2 of the first driver connection lines PO(L) among the plurality of driver connection lines PO(L) and PO(R), the fifth curved line RRR1 shape is formed. Similarly, when connecting the second direction change portions disposed at the boundary portions between the second oblique line portions 0(R) and the second connection portions S22 of the second driver connection lines PO(R) among the plurality of driver connection lines PO(L) and PO(R), the sixth curved line RRR2 shape is formed. The fifth curved line RRR1 and the sixth curved line RRR2 have a shape similar to a wave that is vibrated with predetermined amplitude and interval, rather than the curved line having the predetermined curvature radius. The curved line may have a sinusoidal curve.

Also, although not shown, the second connection portions S2, S22 of the driver connection lines PO(L) and PO(R) disposed between the data driver DP and the oblique line portions O of the driver connection lines PO(L) and PO(R) include a plurality of the first portions and a plurality of the second portions extending in different directions, and the first portions and the second portions are alternately disposed one by one. In detail, the second connection portions S2, S22 of the driver connection lines PO(L) and PO(R) have a plurality of the first portions extending in the first direction parallel to the gate line and a plurality of the second portions extending in the second direction parallel to the data line, and the first portions and the second portions may be alternately dispose and connected.

In this way, by changing the shape and the position of the imaginary lines connecting the direction change portions between the oblique line portions and the second connection portions of the driver connection lines, the direction of the imaginary line formed by connecting the direction change portions and the direction in which the centrifugal force is applied during the spin coating may be different. Accordingly, the display quality deterioration according to the height difference of the material layer such as the alignment layer may be prevented.

Many characteristics of the liquid crystal display according to the exemplary embodiments described with reference to FIG. 1 to FIG. 4 may be applied to the liquid crystal display according to the present exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a substrate including a display area and a peripheral area surrounding the display area;
   a plurality of gate lines and a plurality of data lines disposed at the display area of the substrate;
   a data driver transmitting a data signal to the plurality of data lines; and
   a plurality of driver connection lines disposed at the peripheral area of the substrate and connecting the plurality of data lines and the data driver,
   wherein the plurality of driver connection lines include a plurality of first connection portions connected to the plurality of data lines, a plurality of second connection portions connected to the data driver, and a plurality of oblique line portions disposed between the plurality of first connection portions and the plurality of second connection portions,
   wherein an imaginary line connecting a plurality of direction change portions disposed at boundary portions between the plurality of second connection portions and the plurality of oblique line portions has a curved line shape,
   wherein a reference straight line is another imaginary line connecting a first direction change portion and a second direction change portion of the plurality of direction change portions, the first direction change portion being a portion of the an outermost driver connecting line with respect to the data driver and the second direction change portion being a portion of an innermost driver connecting line with respect to the data driver,
   wherein a first driver connection line includes a third direction change portion farthest from the reference straight line of the plurality of direction change portions and a first oblique line portion connected to the third direction change portion, and
   wherein a ratio of a first distance, a minimum distance from the reference straight line to the first oblique line portion, to a second distance, a maximum distance from the reference straight line to the first oblique line portion, is more than 20%.

2. The display device of claim 1, wherein the ratio is more that 24%.

3. The display device of claim 1, further comprising:
   a plurality of first field generating electrodes disposed on the substrate and connected to the plurality of gate lines and the plurality of data lines; and
   a second field generating electrode disposed on the substrate and overlapping the first field generating electrode via an insulating layer.

4. The display device of claim 1, wherein
   the plurality of driver connection lines include a plurality of first driver connection lines including oblique line portions extending toward a left lower direction toward the display area with reference to the data driver, and a plurality of second driver connection lines including oblique line portions extending toward a right lower direction toward the display area.

5. The display device of claim 4, wherein
   the ratio is more than 24%.

6. The display device of claim 4, further comprising:
   a plurality of first field generating electrodes disposed on the substrate and connected to a plurality of thin film transistors and a plurality of data lines; and a second field generating electrode disposed on the substrate and overlapping the first field generating electrode via an insulating layer.

7. The display device of claim 1, wherein
the second connection portions of the plurality of driver connection lines include a plurality of first portions and a plurality of second portions extending in different directions, and
the plurality of first portions and the plurality of second portions are alternately disposed one by one and are connected to each other.

8. The display device of claim 7, wherein
the plurality of first portions extend in a direction parallel to the plurality of gate lines, and the plurality of second portions extend in a direction parallel to the plurality of data lines.

9. The display device of claim 7, wherein
the plurality of driver connection lines include a plurality of first driver connection lines including oblique line portions extending toward a left lower direction toward the display area with reference to the data driver, and a plurality of second driver connection lines including oblique line portions extending toward a right lower direction toward the display area.

10. The display device of claim 9, further comprising
a plurality of first field generating electrodes disposed on the substrate and connected to a plurality thin film transistors and a plurality of data lines; and
a second field generating electrode disposed on the substrate and overlapping the first field generating electrode via an insulating layer.

11. A display device comprising:
a substrate including a display area and a peripheral area surrounding the display area;
a plurality of gate lines and a plurality of data lines disposed at the display area of the substrate;
a data driver transmitting a data signal to the plurality of data lines; and
a plurality of driver connection lines disposed at the peripheral area of the substrate and connecting the plurality of data lines and the data driver,
wherein the plurality of driver connection lines include a plurality of first connection portions connected to the plurality of data lines, a plurality of second connection portions connected to the data driver, and a plurality of oblique line portions disposed between the plurality of first connection portions and the plurality of second connection portions,
wherein an imaginary line connecting a plurality of direction change portions disposed at boundary portions between the plurality of second connection portions and the plurality of oblique line portions does not have a straight line,
wherein a reference straight line is another imaginary line connecting a first direction change portion and a second direction change portion of the plurality of direction change portions, the first direction change portion being a portion of the an outermost driver connecting line with respect to the data driver and the second direction change portion being a portion of an innermost driver connecting line with respect to the data driver,
wherein a first driver connection line includes a third direction change portion farthest from the reference straight line of the plurality of direction change portions and a first oblique line portion connected to the third direction change portion, and
wherein a ratio of a first distance, a minimum distance from the reference straight line to the first oblique line portion, to a second distance, a maximum distance from the reference straight line to the first oblique line portion, is more than 20%.

12. The display device of claim 11, wherein the ratio is more than 24%.

13. The display device of claim 11, wherein the curved line has a vertex on the driver connection line connected to an off-center of the data driver.

14. The display device of claim 11, wherein the curved line has a dual vertex on the driver connection line.

15. The display device of claim 11, wherein the curved line has a sinusoidal curve.

* * * * *